UNITED STATES PATENT OFFICE.

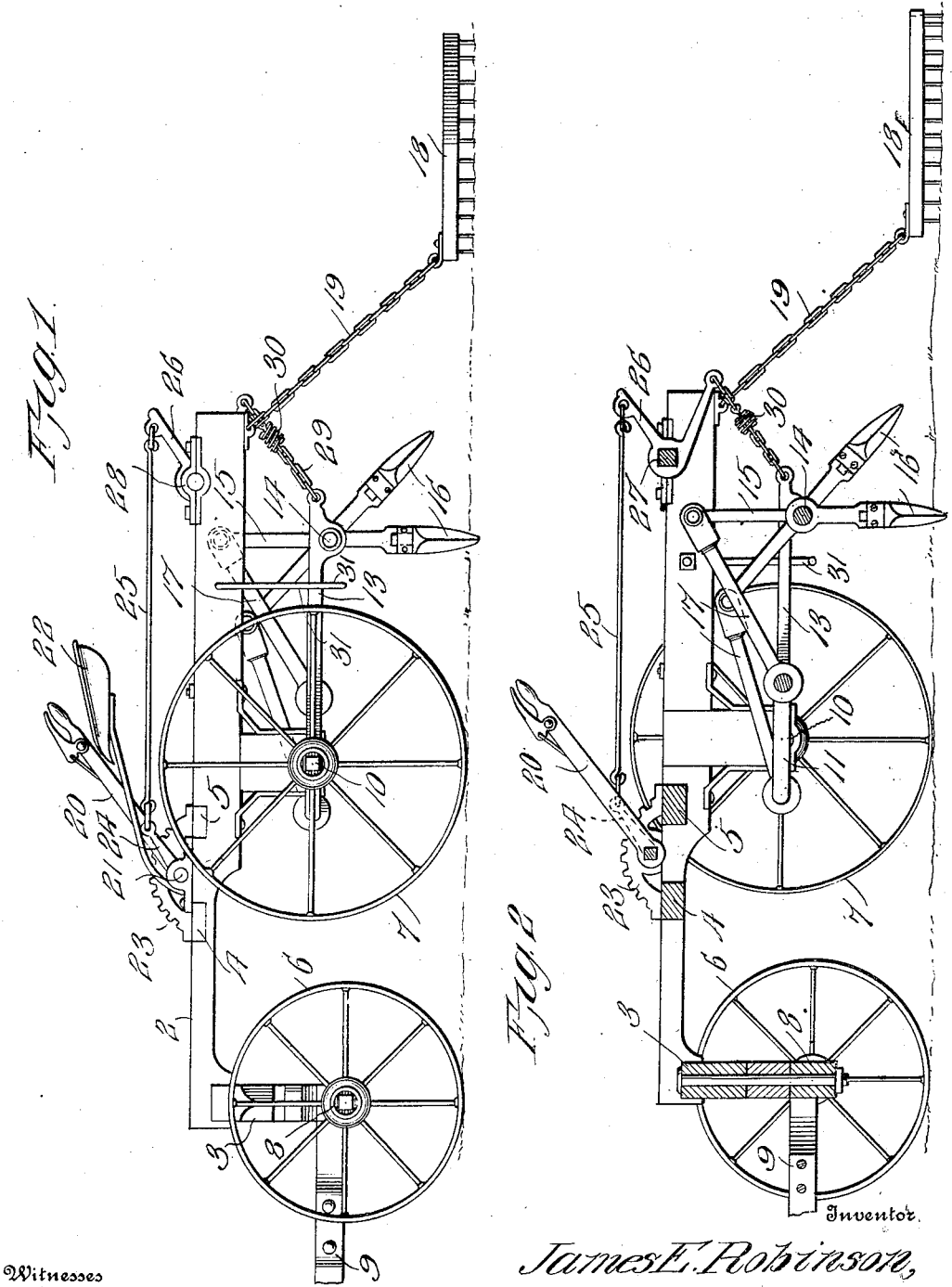

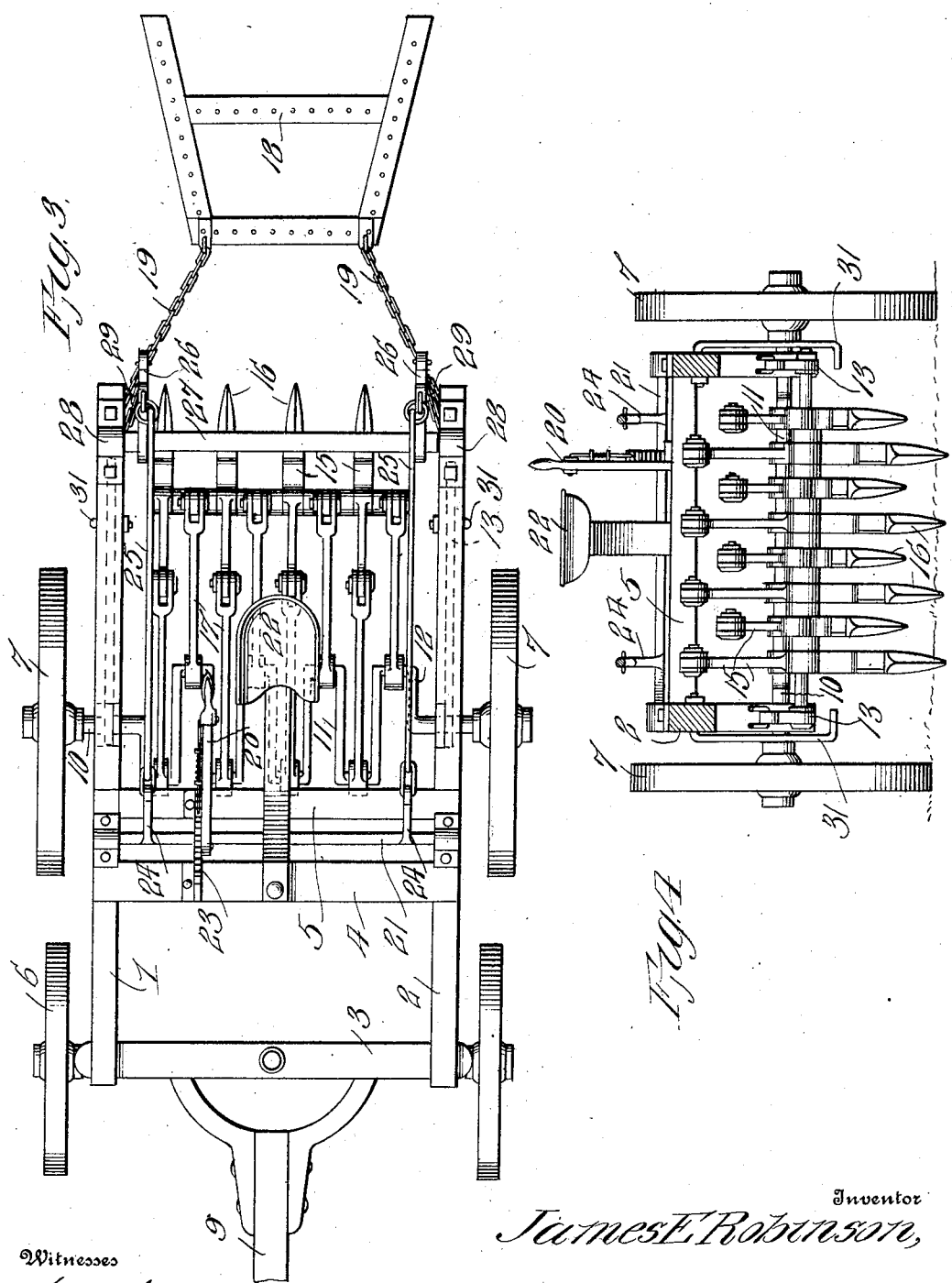

JAMES ED ROBINSON, OF FAYETTEVILLE, TENNESSEE.

HARROW.

No. 897,150.  Specification of Letters Patent.  Patented Aug. 25, 1908.

Application filed April 28, 1908. Serial No. 429,632.

*To all whom it may concern:*

Be it known that I, JAMES ED ROBINSON, a citizen of the United States, residing at Fayetteville, in the county of Lincoln and State of Tennessee, have invented new and useful Improvements in Harrows, of which the following is a specification.

This invention relates to harrows, the object of the invention being to provide an effective harrow and clod crusher and cutter, the machine embodying a plurality of alternating clod cutters or slicers which travel in advance of the drag or ordinary harrow and break up the larger particles or clods, thereby rendering the harrow more effective of disintegrating or breaking up the soil.

The invention consists in the novel construction, combination and arrangement herein fully described, illustrated and claimed.

In the accompanying drawings:—Figure 1 is a side elevation of a harrow embodying the present invention. Fig. 2 is a vertical longitudinal section through the same. Fig. 3 is a plan view of the machine. Fig. 4 is a vertical cross section through the machine taken in rear of the clod cutters.

The machine embodies a main frame composed of parallel side bars 1 and 2 and a plurality of cross bars 3, 4 and 5 connecting the same the said frame being mounted upon forward and rear carrying wheels 6 and 7, respectively. The front wheels 6 are mounted on the forward axle 8 to which is connected a draft pole or tongue 9.

The rear wheels 7 which are in reality traction wheels are mounted fast on a crank axle 10 which is provided with a plurality of oppositely set cranks 11 and 12 for a purpose which will hereinafter appear.

In connection with the main frame above described, I employ a swing frame embodying oppositely arranged bars 13 journaled at their forward ends on the crank axle 10 as indicated by dotted lines in Fig. 3. Adjacent to their free ends, the bars 13 carry a fulcrum bar or rod 14 upon which is mounted a plurality of lever arms 15 each of which carries at its lower end a clod cutter or slicer 16 in the form of a two edged blade.

The upper extremities of the lever arms 15 have pivotally connected thereto forwardly extending links or connecting rods 17 the forward ends of which are operatively connected with the cranks 11 and 12 of the crank axle 10 under the alternate arrangement shown in the plan view, Fig. 3. In other words, the lever arms 15 are set to operate alternately and simultaneously in opposite directions as clearly indicated by the disposition of the cranks 11 and 12 in Fig. 3. Thus the knives or cutters 16 operate with a positive action to break up the clods in advance of the usual drag harrow shown at 18 which is drawn along in rear of the machine above described, being connected thereto by one or more chains 19.

The swing frame which carries the cutters 16 is rendered adjustable up and down as follows. 20 designates a thumb latch lever which is fulcrumed at 21 on the machine frame within reach of the driver in the seat 22, said lever operating in connection with a holding rack 23. The fulcrum of the lever consists of a rock shaft provided with a plurality of crank arms 24 from which connecting rods 25 extend back and have a jointed connection with bell crank levers 26 mounted on a square shaft 27 journaled in bearings 28 on the main frame. From the lower arms of said bell crank levers spring connections 29 extend downward to the rear ends of the bars 13 of the swing frame so that by moving the thumb latch lever 20, the cutters 16 may be raised and lowered to suit conditions. Each of the connections 29 preferably embodies a spring cock-eye 30 to adapt the swing frame to yield readily to obstacles and thereby prevent injury to the cutters. 31 designates oppositely arranged stirrups the lower ends of which underlie the spring bars 13 and limit the downward movement of the same.

I claim:—

1. A harrow comprising a wheeled frame, a crank axle having a traction wheel fast thereon, a swing frame, a fulcrum rod on said swing frame, and oscillatory clod cutters journaled on said rod and operatively connected with the crank axle in such manner that alternate cutters are simultaneously moved in opposite directions.

2. A harrow comprising a wheeled frame, a crank axle having a traction wheel fast thereon, a swing frame, a fulcrum rod on said swing frame, oscillatory clod cutters journaled on said rod and operatively connected with the crank axle in such manner that alternate cutters are simultaneously moved in opposite directions, and means for raising and lowering said swing frame.

In testimony whereof I affix my signature in presence of two witnesses.

JAMES ED ROBINSON.

Witnesses:
J. F. TAYLOR,
F. C. ALLISON.